June 2, 1931. A. H. LEIPERT 1,808,358
YIELDING CONE DISK
Filed March 23, 1928
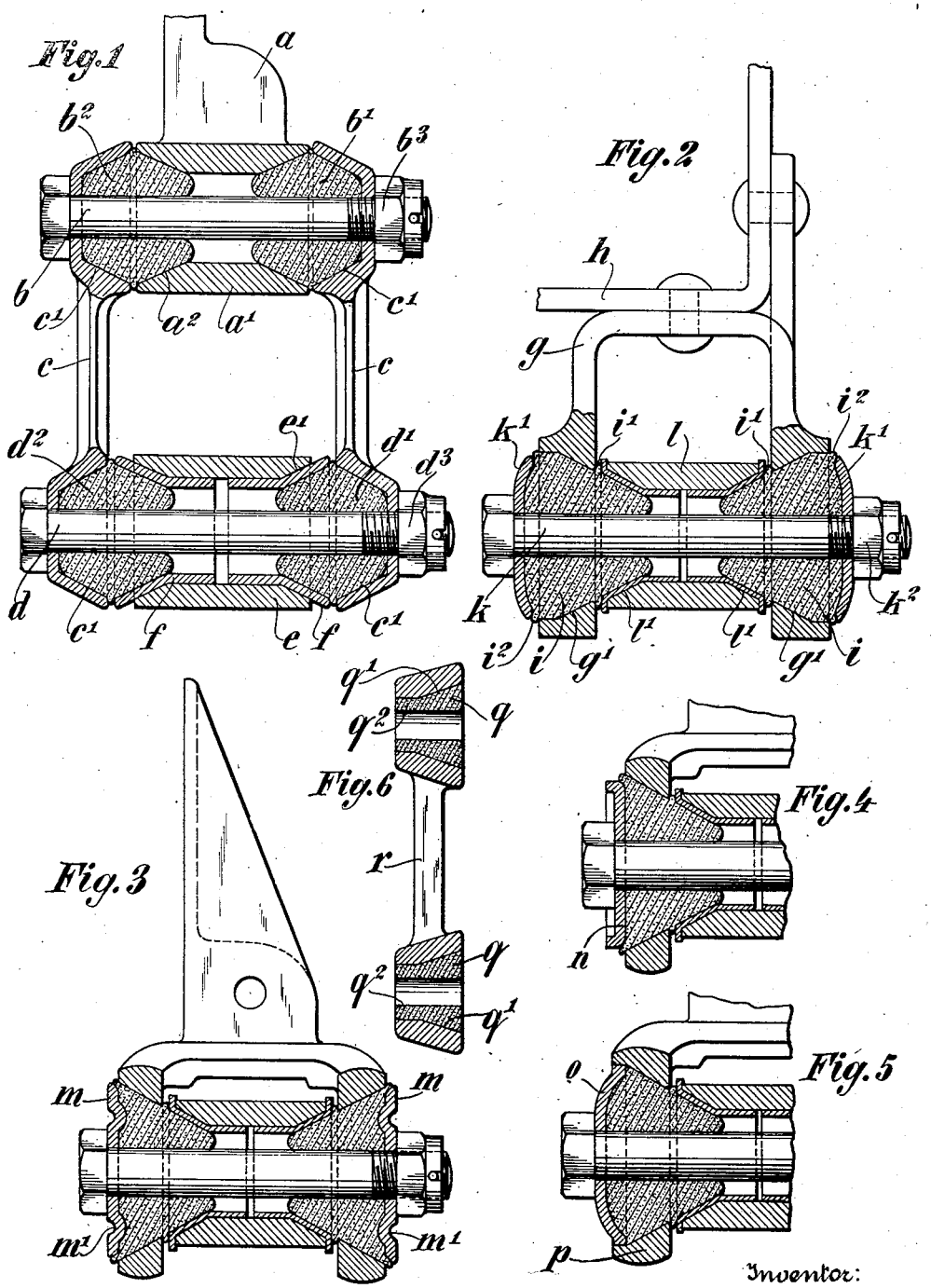
Inventor:
August H. Leipert,
By his Attorneys
Redding, Greeley, O'Shea + Campbell Patented June 2, 1931

1,808,358

UNITED STATES PATENT OFFICE

AUGUST H. LEIPERT, OF COLLEGE POINT, NEW YORK, ASSIGNOR TO THE RUBBER SHOCK INSULATOR CORPORATION, OF NEW YORK, N. Y., A CORPORATION OF DELAWARE

YIELDING CONE DISK

Application filed March 23, 1928. Serial No. 264,108.

In United States Letters Patent Nos. 1,400,563, dated December 20, 1921, and 1,404,876, dated January 31, 1922, there is disclosed and claimed a wholly non-metallic connection and support between two metal parts. It has since been proposed to provide such a connection in the form of a yielding, non-metallic bushing interposed operatively between the two metal portions to be connected and to associate with such a bushing means to compress it and to hold it against slippage with respect to the two such metal portions. The present invention is another form of that covered by the two above recited Letters Patent and partakes of the characteristics of the embodiments illustrated therein and also of the so-called bushing type connection. It is adapted particularly for the connection of two metal parts which have relative oscillation, as is the case in shackle connections for the springs of vehicles. More particularly, the invention is concerned with the provision of such a connection wherein a plurality of units are provided at spaced intervals and means are associated therewith to simultaneously compress all of such units and engage them with metal portions for retention against slippage. Still another important object of the invention is to so form the non-metallic, yielding connectors as to more effectively resist forces acting in any and all planes to displace the two connected metal parts relatively.

In accordance with the invention, it is proposed to provide, in the case of a shackle connection, two blocks of rubber at spaced intervals on the pintle and having opposed, inclined surfaces engaging at least one of the connected metal parts, whereby forces other than those applied radially of the pintle are more effectively resisted. This condition may be accomplished in various embodiments as will appear more particularly hereinafter, although generally speaking the most practical forms thus far devised have been those in which the non-metallic material is of frusto-conical or frusto-pyramidal form or in which reversely inclined surfaces are moulded in a single unit but of such form.

The invention will be more fully described in connection with the accompanying drawings showing practical embodiments with several forms of fittings in which Figure 1 is a view in vertical section showing the application of the improvements as a connection for a spring shackle to a vehicle frame.

Figure 2 is a view partly in vertical section showing another form of the invention applied to the fixed end of a vertical spring.

Figures 3, 4 and 5 are sectional views similar to Figure 2 but showing somewhat modified forms of connectors and fittings.

Figure 6 is a view partly in section and partly in elevation of a modified form of shackle and block made in accordance with the invention.

Referring now to Figure 1, there is illustrated a depending bracket $a$ from the vehicle frame formed with an open eye $a'$ which may be of circular or other cross-section to receive therethrough a pintle bolt $b$. Adjacent opposite ends of this bolt are secured shackle members $c$ the lower ends of which are secured to a second pintle bolt $d$ which extends through the eye $e$ of what may be a vehicle spring. The invention is concerned with improved means for connecting the spring $e$ to the bracket $a$ through wholly non-metallic, yielding means. This result is accomplished in accordance with the invention by providing at opposite ends of each bolt $b$, $d$ connecters $b'b^2$ and $d'd^2$, respectively, of suitable non-metallic, yielding material such as rubber. It is desirable for reasons which now exist in the art to place the material constituting the said connectors under compression and, it is conducive in a shackle operation of this character to have this material held, so far as is practical, against slippage with respect to the metal surfaces which engage the material, so that oscillatory movements are accommodated largely within the body of the material itself. It also seems advisable, in vehicle construction particularly to incorporate in the shackle connection means for effectively resisting forces other than radial, such as, for instance, those forces incident to sideway of the vehicle in some manner which will result in minimum stresses in the associated elements. All of the conditions just enumerated are provided for in the new construction by forming each one of the connectors $b'b^2$, $d'd^2$ with inclined surfaces which are so disposed and opposed relatively as to resist forces in all directions. As shown in Figure 1, the eyes $a'$, $e$ may have their opposite ends inclined as indicated at $a^2$, $e'$, respectively, for cooperation with the inclined sides of the respective connectors which are seated thereon. It may be advisable, as indicated in Figure 1, to place within the eye $e$ suitable metal seats $f$ which may be formed somewhat as thimbles, but conforming in cross-sectional outline to the bore of the eye $e$ and to the inclined ends $e'$ thereof, these seats, when assembled, being preferably spaced apart. The connectors shown in Figure 1 are each also formed with reversely inclined surfaces adapted to be received by similarly formed seats $c'$ in the shackle member $c$. Each of the connectors is also formed with a central opening through which pass the respective bolts $b$, $d$. When the parts of the character described are assembled in the relationship indicated, it will be evident that when the nuts $b^3$, $d^3$ are screwed up on the respective bolts $b$, $d$, the respective connectors associated therewith will be compressed between the opposed seats in the respective eyes and the seats in the respective shackle pieces which are reversely inclined with respect to the seats of the eyes and will also be brought into snug frictional engagement with the seats, so as to be held thereon and against the bolts to prevent slippage. This last named condition might also be aided by making the eyes or the bolts, or both, of irregular cross-sectional outline. The load of the vehicle will, of course, be transmitted through the metal parts substantially radially of the bolts. However, additional forces will be compressed on the parts in planes other than vertical planes and such forces, no matter in what direction, will have their components most effectively resisted by the opposed, inclined surfaces of the various spaced conductors. Relative oscillation of the connected metal parts will be accommodated within the mass of the yielding material.

In the embodiment shown in Figure 2, a bracket $g$ on the frame $h$ of the vehicle has depending arms with aligned openings therein tapered, as indicated at $g'$. In these openings are seated blocks $i$ of yielding, non-metallic material, the general form of which may be frusto-conical or frusto-pyramidal. The inclination of the surfaces of the respective blocks is relatively reverse so that one block cooperates with the other in opposing forces other than radial. A bolt $k$ passes through the blocks and carries thereon concavo plates $k'$ constituting seats engaging the outer ends of the blocks $i$, whereby they confine and compress when the nut $k^2$ is screwed up on the bolt. The spring eye $l$ has its bore reversely tapered at opposite ends, as indicated at $l'$, the taper being similar to and substantially a continuation of, in each instance, the taper $g'$ of the openings in the supporting yoke $g$. However, the spring eye $l$ will be spaced from the arms and the yielding material, when compressed, may flow into such opening, as indicated at $i'$, as is desired in the interest of resiliency and security. Similarly, the end plates $k'$, when the parts are assembled, will be spaced from the outer sides of the yoke $g$ so as to afford additional space for the flow of yielding material, as indicated at $i^2$.

So far as concerns the general character of the non-metallic connectors and the relationship of parts, the modification illustrated in Figure 3 is substantially like the construction shown in Figure 2. The principal difference is in the character of the end plates $m$ which may be substantially flat as shown but formed with a corrugation or rib $m'$ in the interest of rigidity and strength.

In Figure 4, the end plate $n$ is shown as cup-shaped and in Figure 5 the end plate $o$ while of concavo form, as in Figure 2, has a nice fit within the opening in the arm of the yoke $p$, thereby confining and protecting the yielding material more completely. This might not be desirable in all instances, because it has been found advantageous to afford the material rather full opportunity to flow when compressed.

In Figure 6, the arrangement is somewhat further modified in that the block $q$ of the material constituting the connector is only partly of conical or pyramidal outline and partly of cylindrical or other regular form. As illustrated, the conical or pyramidal section indicated at $q'$ fits within the correspondingly formed seat in the metal shackle $r$, while the extended regular portion $q^2$ of the block fits within a similarly shaped part of the shackle. Greater radial bearing area is thus obtained and yet the advantage of having inclined, opposed surfaces is retained. A somewhat modified connection in this form might also be provided for by having the parts of such character that slippage between the section $q'$ and the metal is prevented, while some degree of slippage between the inclined portion $q'$ of the block and the metal is permitted, the torsional forces within the material pulling up during relative oscillations.

Changes in the number, form and arrangement of the connectors may be made without departing from the spirit of the invention, so long as the described action and advantages are obtained by means which satisfy the appended claim.

What I claim is:

A wholly non-metallic connection and support between two metallic parts of a motor vehicle, one of which parts is to be connected to and supported by the other of said parts, comprising cup-shaped recesses carried by each of the respective parts having axially inclined bearing surfaces, independent blocks of yielding material spaced from one another and engaged along separated surfaces with the respective parts and having axial openings extending therethrough presenting extended bearing surfaces, and means extending through the openings in the blocks to secure the parts together, the first-named engaging surfaces of said blocks being relatively inclined to one another, and certain of the engaging surfaces of each of the respective blocks being relatively inclined with respect to each other and to the surfaces within the axial openings to engage the inclined bearing surfaces of the cup-shaped recesses.

This specification signed this 19th day of March, A. D. 1928.

AUGUST H. LEIPERT.